(12) United States Patent
Kojima

(10) Patent No.: US 9,807,853 B2
(45) Date of Patent: Oct. 31, 2017

(54) LIGHTING DEVICE, LIGHTING SYSTEM, AND EXTERNAL POWER SOURCE DEVICE

(71) Applicant: CANON KABUSHIKI KAISHA, Tokyo (JP)

(72) Inventor: Teruyuki Kojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/416,362

(22) Filed: Jan. 26, 2017

(65) Prior Publication Data
US 2017/0215255 A1 Jul. 27, 2017

(30) Foreign Application Priority Data
Jan. 27, 2016 (JP) ................................. 2016-013499

(51) Int. Cl.
| | | |
|---|---|---|
| H05B 37/02 | (2006.01) | |
| H02J 7/00 | (2006.01) | |
| H02J 7/34 | (2006.01) | |
| H04N 5/225 | (2006.01) | |

(52) U.S. Cl.
CPC ........ *H05B 37/0227* (2013.01); *H02J 7/0063* (2013.01); *H02J 7/345* (2013.01); *H04N 5/2256* (2013.01)

(58) Field of Classification Search
CPC ... H05B 37/02; H05B 37/0227; H02J 7/0063; H02J 7/345; H04N 5/2256
USPC ........................................................ 315/160
See application file for complete search history.

(56) References Cited

U.S. PATENT DOCUMENTS

| | | | | |
|---|---|---|---|---|
| 4,855,781 A | * | 8/1989 | Hoshino | .......... G01R 19/16542 396/277 |
| 8,259,221 B1 | * | 9/2012 | Kaplan | ................. H02J 7/0055 320/114 |
| 2012/0306933 A1 | * | 12/2012 | Osako | ..................... A63F 13/26 345/672 |
| 2015/0362987 A1 | * | 12/2015 | Shin | ...................... G06F 1/3296 713/322 |
| 2017/0093210 A1 | * | 3/2017 | Recker | .................... H02J 9/061 |
| 2017/0150448 A1 | * | 5/2017 | Stagg | ................ H04W 52/0261 |

FOREIGN PATENT DOCUMENTS

| | | |
|---|---|---|
| JP | 2001-215576 A | 8/2001 |
| JP | 2003-098577 A | 4/2003 |

* cited by examiner

*Primary Examiner* — Don Le
(74) *Attorney, Agent, or Firm* — Cowan, Liebowitz & Latman, P.C.

(57) ABSTRACT

A lighting device that is capable of discriminating a type of an external power source device connected from among types of connectable devices without increasing the number of terminals of a connector. A connector is electrically connectable to an external power source device and includes a first terminal for supplying electric power from the external power source device to a main capacitor and a second terminal for discriminating a type of the external power source device. An obtaining unit obtains the information for discriminating the type of the external power source device by comparing a voltage value of a signal input to the second terminal from the external power source device with a predetermined voltage threshold when an attribute of the second terminal is set to an input. A discrimination unit discriminates the type of the external power source device by contrasting the information obtained with information stored.

10 Claims, 8 Drawing Sheets

LIGHTING DEVICE, LIGHTING SYSTEM, AND EXTERNAL POWER SOURCE DEVICE

BACKGROUND OF THE INVENTION

Field of the Invention

The present invention relates to a lighting device, a lighting system, and an external power source device, and particularly relates to a technique for discriminating a type (a classification, a model) of an external power source device that is connected to the lighting device.

Description of the Related Art

An electronic flash device as a lighting device that is built in an image pickup apparatus or that is detachably mounted on an image pickup apparatus is generally provided with a light emitting component, such as a xenon tube, and a main capacitor for supplying electric power to the light emitting component. For example, Japanese Laid-Open Patent Publication (Kokai) No. 2001-215576 (JP 2001-215576A) and Japanese Laid-Open Patent Publication (Kokai) No. 2003-098577 (JP 2003-098577A) disclose electronic flash devices each of which is provided with a booster circuit for boosting battery voltage to high voltage in order to supply electric power to a main capacitor. JP 2001-215576A discloses a technique that controls the booster circuit that charges the main capacitor according to a comparison result of capacity of a battery in an external power source device and capacity of a battery in the electronic flash device when the external power source device for the electronic flash (hereinafter referred to as an "external power source device") is connected. JP 2003-098577A discloses a technique that controls the booster circuit that charges the main capacitor according to a comparison result of a consumption state of a battery in an external power source device and a consumption state of a battery in the electronic flash device when the external power source device is connected.

A conventional electronic flash device to which an external power source device is connectable is generally provided with three terminals including a high voltage input terminal for supplying electric power to a main capacitor, an SEH-signal terminal for controlling and determining an external power source device, and a GND terminal. However, the conventional electronic flash device is not provided with a means for discriminating an old-type external power source device and a new-type external power source device that is improved in predetermined electrical performance. Accordingly, when the external power source devices of different types are electrically connectable to the electronic flash device, there is a problem that the electronic flash device cannot exert the function of the connected external power source device sufficiently even if the new-type external power source device that is improved in the electrical performance is connected.

In order to solve such a problem, there is a method to add a detection signal line for discriminating the type of the connected external power source device to the electronic flash device. However, since it is necessary to provide a terminal corresponding to the detection signal line in this case, the number of terminals changes, which loses the physical compatibility of a connector that consists of a plurality of terminals. Accordingly, there is a problem that only one of the old-type external power source device and the new-type external power source device that is improved in the electrical performance is allowed to connect.

SUMMARY OF THE INVENTION

The present invention provides a technique to allow the lighting device to discriminate a type of an external power source device actually connected to a lighting device from among a plurality of types of connectable external power source devices without increasing the number of terminals for electrically connecting an external power source device to the lighting device.

Accordingly, a first aspect of the present invention provides a lighting device including a light emitting component, a main capacitor that supplies electric power to the light emitting component, a connector that is electrically connectable to an external power source device and that includes a first terminal for supplying electric power from the external power source device to the main capacitor and a second terminal for discriminating a type of the external power source device, a switching unit configured to switch an input-output attribute of the second terminal, a storage unit configured to store information for discriminating a type of an external power source device connectable to the connector, an obtaining unit configured to obtain the information for discriminating the type of the external power source device by comparing a voltage value of a signal input to the second terminal from the external power source device with a predetermined voltage threshold when the switching unit sets the attribute of the second terminal to an input, and a discrimination unit configured to discriminate the type of the external power source device by contrasting the information that the obtaining unit obtained with the information stored in the storage unit.

Accordingly, a second aspect of the present invention provides a lighting system including the lighting device of the first aspect and an external power source device that is electrically connectable to the lighting device. The external power source device includes a second connector that includes a third terminal that is connectable to the first terminal and supplies electric power to the main capacitor and a fourth terminal that is connectable to the second terminal and detects at least a state of the lighting device, and a power supply unit configured to supply predetermined high voltage to the third terminal.

Accordingly, a third aspect of the present invention provides the external power source device constituting the second aspect.

According to the present invention, the lighting device discriminates a type of an external power source device actually connected to the lighting device from among a plurality of types of connectable external power source devices without increasing the number of terminals for electrically connecting an external power source device to the lighting device.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
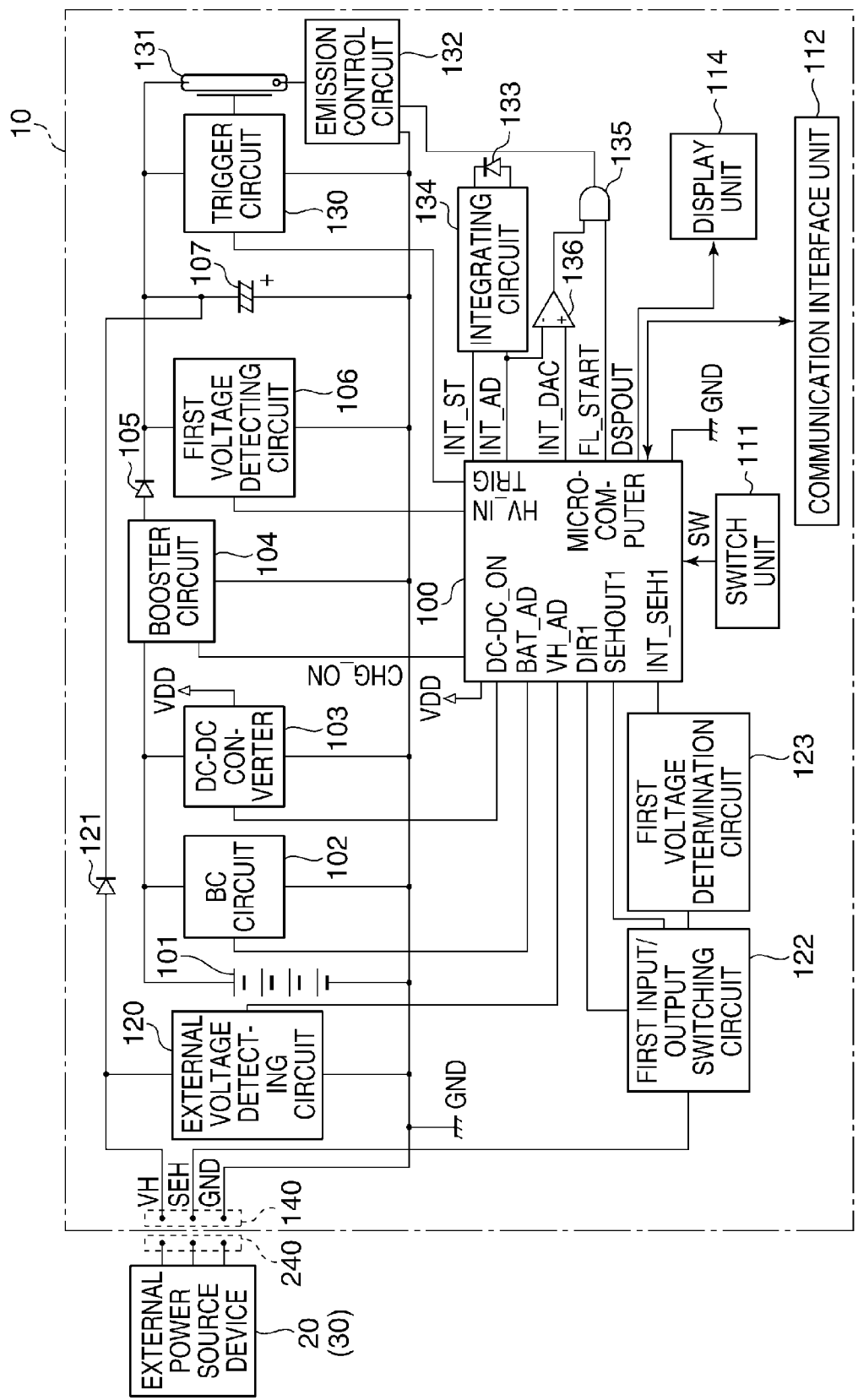
FIG. 1 is a block diagram schematically showing a configuration of an electronic flash device according to an embodiment of the present invention.

FIG. 1 is a block diagram schematically showing a configuration of an electronic flash device 10 as a lighting device according to an embodiment of the present invention. The electronic flash device 10 has a microcomputer (a first control unit) 100, battery 101, battery check circuit 102 (hereinafter referred to as a "BC circuit 102"), DC-DC converter 103, booster circuit 104, and high voltage rectification diode 105. Moreover, the electronic flash device 10 has a first voltage detecting circuit 106, a main capacitor 107, a switch unit 111, a communication interface unit 112, a display unit 114, an external voltage detecting circuit 120, a diode 121, a first input/output switching circuit 122, and a first voltage determination circuit 123. Furthermore, the electronic flash device 10 has a trigger circuit 130, a flash discharge tube 131 as a light source, an emission control circuit 132, a photodiode 133, an integrating circuit 134, an AND gate 135, a comparator 136, and a first connector (a first connecting member) 140.

The battery 101 is an internal electrical power source equipped in the electronic flash device 10. The microcomputer 100 controls each part of the electronic flash device 10. The microcomputer 100 is a one-chip IC including a CPU, a ROM, a RAM, an input-output control circuit (I/O control circuit), a multiplexer, a timer circuit, an A/D converter, a D/A converter, etc. It should be noted that the ROM or EEPROM of the microcomputer 100 stores the below-mentioned ID signal pattern that is an example of information showing an external power source device that is electrically connectable (hereinafter referred to as "connectable") to the electronic flash device 10.

The BC circuit 102 detects voltage of the battery 101 by detecting output voltage of the battery 101 under load, and transmits a detected state of the battery 101 to the microcomputer 100. The DC-DC converter 103 generates predetermined stable voltage VDD from the battery 101, and supplies it to each part of the electronic flash device 10. The booster circuit 104 boosts the voltage of the battery 101 to high voltage of several hundred volts, and charges the main capacitor 107 with electrical energy. The high voltage rectification diode 105 rectifies the output voltage from the booster circuit 104.

An anode of the high voltage rectification diode 105 is connected to the booster circuit 104, and a cathode is connected to the first voltage detecting circuit 106. The first voltage detecting circuit 106 detects the voltage of the main capacitor 107, and transmits a signal indicating the charging voltage (a voltage-divided signal that is proportional to the actual charging voltage in this embodiment) to the microcomputer 100. The signal indicating the charging voltage is input into an A/D converter (not shown) with which the microcomputer 100 is provided. The main capacitor 107 stores electrical energy required for emitting flash light. When receiving a TRIG signal (a pulse signal) output from the microcomputer 100 as a light emission start signal, the trigger circuit 130 triggers the flash discharge tube 131 to make the flash discharge tube 131 emit light. It should be noted that a secondary winding (not shown) of the trigger transformer is connected to a trigger unit of the flash discharge tube 131.

The flash discharge tube 131 is a light emitting component, such as a xenon tube. A positive pole of the main capacitor 107, one end of the trigger circuit 130, one end of the first voltage detecting circuit 106, and a cathode of the diode 121 are connected to a positive pole of the flash discharge tube 131. One end of the emission control circuit 132 is connected to a negative pole of the flash discharge tube 131. When the booster circuit 104 boosts the voltage of the battery 101, a trigger capacitor (not shown) in the trigger circuit 130 is charged. When a thyristor in the trigger circuit 130 is turned ON according to the TRIG signal and the trigger capacitor discharges, a pulse occurs in the primary winding of the trigger transformer in the trigger circuit 130, and accordingly a high voltage pulse occurs in the secondary winding. Accordingly, the flash discharge tube 131 is triggered, and the flash discharge tube 131 emits light.

The emission control circuit 132 controls emission of the flash discharge tube 131 under the control of the microcomputer 100. The integrating circuit 134 integrates photocurrent of the photodiode 133, and its output is input into an inverting input terminal of the comparator 136 and an A/D converter terminal (INT_AD) of the microcomputer 100. A non-inverting input terminal of the comparator 136 is connected to a D/A converter terminal (INT_DAC) of the microcomputer 100. An output terminal of the comparator 136 is connected to an input terminal of the AND gate 135. Another input terminal of the AND gate 135 is connected an emission-control terminal (FL_START) of the microcomputer 100. The output signal of the AND gate 135 is input into the emission control circuit 132. The photodiode 133 is a sensor that receives light emitted from the flash discharge tube 131 directly or through a glass fiber.

The switch unit 111 detects changes of switches of various operating members, such as a power button, a mode setting button for setting an operation mode of the electronic flash device 10, and a setting button for setting various parameters. The switch unit 111 transmits signals corresponding to operations of the operating members to the microcomputer 100. The microcomputer 100 performs various processes corresponding to the signals from the switch unit 111. The display unit 114 consists of a liquid crystal display, a light emitting element, etc. and displays various kinds of information, such as a state of the electronic flash device 10. The communication interface unit 112 is an interface that connects the electronic flash device 10 to an image pickup apparatus (a camera, which is not shown) so as to enable communication. For example, the camera as a host and the electronic flash device 10 mutually perform information communications, such as data exchange and command transfer.

The first connector 140 is a connecting member for connecting an external power source device for an electronic flash to the electronic flash device 10. The first connector 140 has three terminals including a high voltage input terminal (a first terminal) for supplying electric power to the main capacitor 107, an SEH-signal terminal (a second terminal) that has an input-output attribute for controlling and determining an external power source device, and a GND terminal. It should be noted that a physical configuration of the SEH-signal terminal does not vary and the term "has an input-output attribute" means that the SEH-signal terminal is used as an input terminal and also as an output terminal through the first input/output switching circuit 122. This is similar for an SEH-signal terminal of a second connector 240 (a second connecting member) of a first external power source device 20 mentioned later.

The external voltage detecting circuit 120 detects the voltage (VH) of an external power source device, and sends the signal indicating the detected voltage (a voltage-divided signal that is proportional to the detected voltage in this embodiment) to the microcomputer 100. The first input/output switching circuit 122 is connected to the microcomputer 100, first connector 140, and first voltage determination circuit 123, and switches the input-output attribute of the SEH-signal terminal of the first connector 140. The microcomputer 100 controls the first input/output switching circuit 122 using a DIR1 signal to set the attribute of the SEH-signal terminal of the first connector 140 to an input. Accordingly, the SEH signal of the first connector 140 is transmitted to the first voltage determination circuit 123 via the first input/output switching circuit 122. The first voltage determination circuit 123 compares the voltage value of the obtained SEH signal with a predetermined voltage threshold, and transmits the result to the microcomputer 100 (INT_SEH1).

Figure 2:
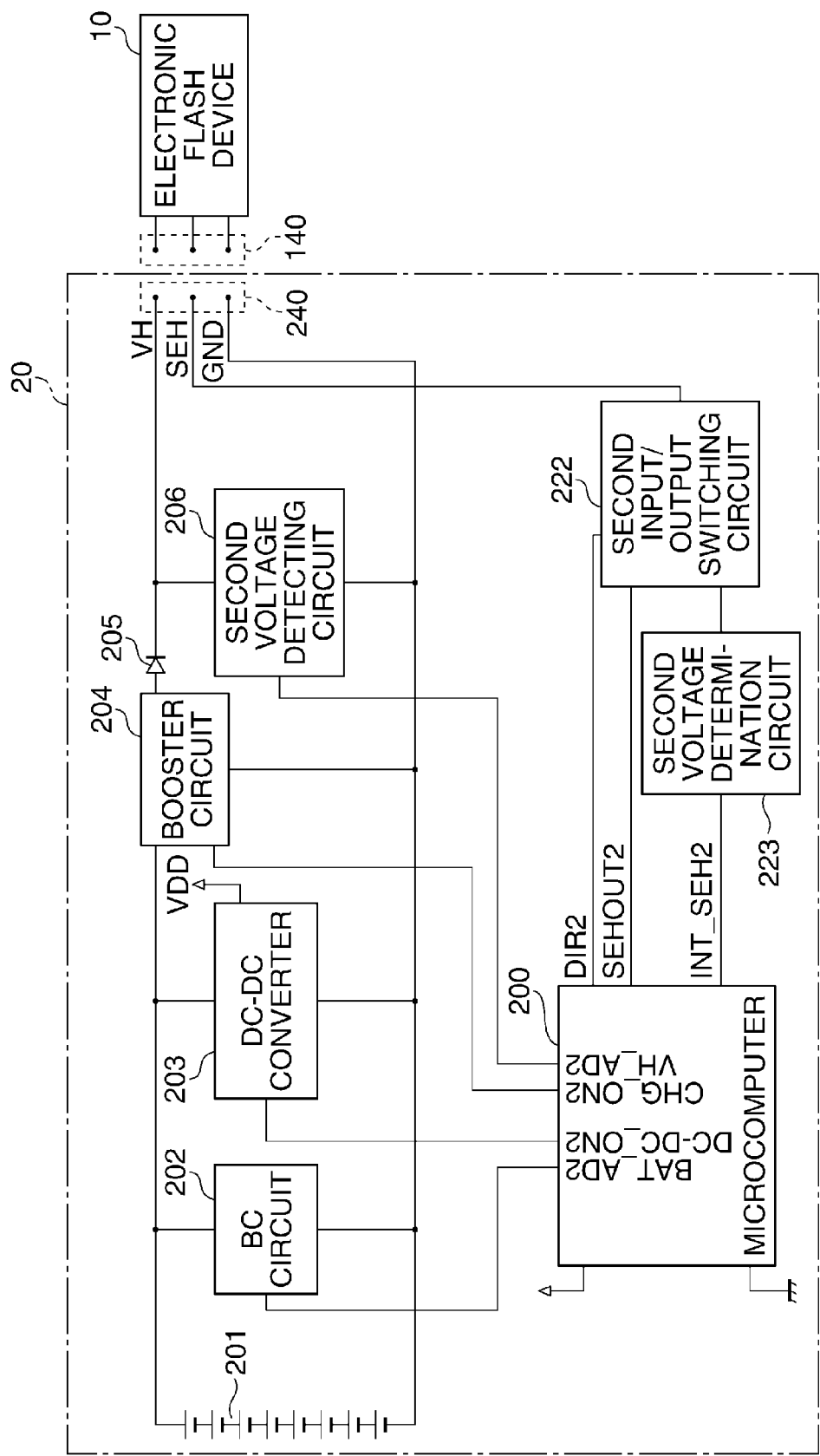
FIG. 2 is a block diagram schematically showing a configuration of a first external power source device that is connectable to the electronic flash device shown in FIG. 1.

FIG. 2 is a block diagram schematically showing a configuration of the first external power source device 20 that is an example of an external power source device connectable to the electronic flash device 10. A lighting system (an electronic flash system) is constituted by connecting the first external power source device 20 to the electronic flash device 10. The first external power source device 20 has a microcomputer 200, battery 201, BC circuit 202, DC-DC converter 203, booster circuit 204, high voltage rectification diode 205, and second voltage detecting circuit 206. Moreover, the first external power source device 20 has a second input/output switching circuit 222, second voltage determination circuit 223, and second connector 240.

The battery 201 is a power source equipped in the first external power source device 20. When viewing from the electronic flash device 10, the battery 201 is positioned as an external power source against the battery 101 as an internal power source. The microcomputer 200 (a second control unit) controls each part of the first external power source device 20. The microcomputer 200 is a one-chip IC including a CPU, a ROM, a RAM, an EEPROM, an I/O control circuit, a multiplexer, a timer circuit, an A/D converter, a D/A converter, etc.

The BC circuit 202 detects voltage of the battery 201 by detecting output voltage of the battery 201 under load, and transmits a detected state of the battery 201 to the microcomputer 200. The DC-DC converter 203 generates predetermined stable voltage VDD from the battery 201, and supplies it to each part of the first external power source device 20. The booster circuit 204 boosts the voltage of the battery 201 to high voltage of several hundred volts, and charges the main capacitor 107 of the electronic flash device 10 with electrical energy via the second connector 240. The high voltage rectification diode 205 rectifies the output voltage from the booster circuit 204.

An anode of the high voltage rectification diode 205 is connected to the booster circuit 204, and a cathode is connected to the second voltage detecting circuit 206. The second voltage detecting circuit 206 detects the voltage (VH) of the booster circuit 204, and sends a signal indicating the detected voltage (a voltage-divided signal that is proportional to the detected voltage in this embodiment) to the microcomputer 200. The signal indicating the charging voltage is input into an A/D converter (not shown) with which the microcomputer 200 is provided. The second connector 240 is a connecting member for connecting the first external power source device 20 to the electronic flash device 10. The second connector 240 has three terminals including a high voltage input terminal (a third terminal) for supplying electric power to the main capacitor 107, an SEH-signal terminal (a fourth terminal) that has an input-output attribute, and a GND terminal. As mentioned above, the booster circuit 204 supplies voltage to the high voltage input terminal.

The second input/output switching circuit 222 is connected to the microcomputer 200, second connector 240, and second voltage determination circuit 223. The second input/output switching circuit 222 switches the input-output attribute of the SEH-signal terminal of the second connector 240. The microcomputer 200 controls the second input/output switching circuit 222 using a DIR2 signal to set the attribute of the SEH-signal terminal of the second connector 240 to the input. Accordingly, the SEH signal of the second connector 240 is transmitted to the second voltage determination circuit 223 via the second input/output switching circuit 222. When the microcomputer 200 controls the second input/output switching circuit 222 using the DIR2 signal and the attribute of the SEH-signal terminal of the second connector 240 is set to an output, the microcomputer 200 outputs a signal of a predetermined voltage value (below-mentioned V21 through V23) as an SEHOUT2 signal.

The second voltage determination circuit 223 compares a predetermined voltage threshold with the SEH signal obtained through the SEH-signal terminal of the second connector 240 and the second input/output switching circuit 222, and transmits the result to the microcomputer 200 (INT_SEH2).

Figure 3:
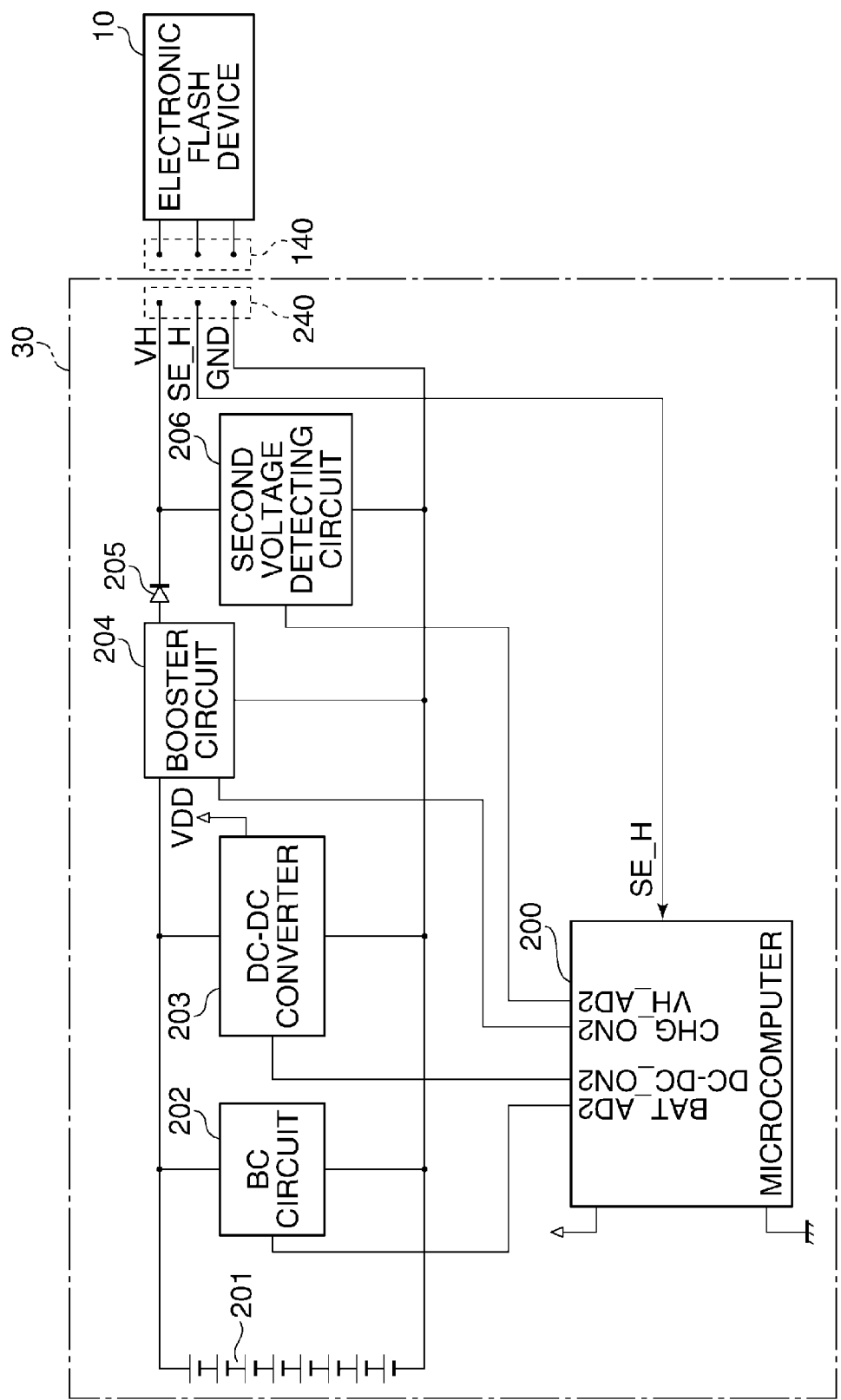
FIG. 3 is a block diagram schematically showing a configuration of a second external power source device that is connectable to the electronic flash device shown in FIG. 1.

FIG. 3 is a block diagram schematically showing a configuration of a second external power source device 30 that is connectable to the electronic flash device 10. The same reference numerals are applied to components of the second external power source device 30 that are equivalent to the components of the first external power source device 20, and descriptions thereof are omitted. The second external power source device 30 is different from the first external power source device 20 in a point that the second input/output switching circuit 222 and second voltage determination circuit 223, which are provided in the first external power source device 20, are not provided. Accordingly, a second connector 240A with which the second external power source device 30 is provided in order to connect the second external power source device 30 to the electronic flash device 10 has an SE_H-signal terminal exclusive for input in place of the SEH-signal terminal that has the input-output attribute. This is another difference from the first external power source device 20. Moreover, the second external power source device 30 is different from the first external power source device 20 in a point that the SE_H-signal terminal is directly connected to the microcomputer 200 through a pull-up resistor (not shown).

Figure 4:
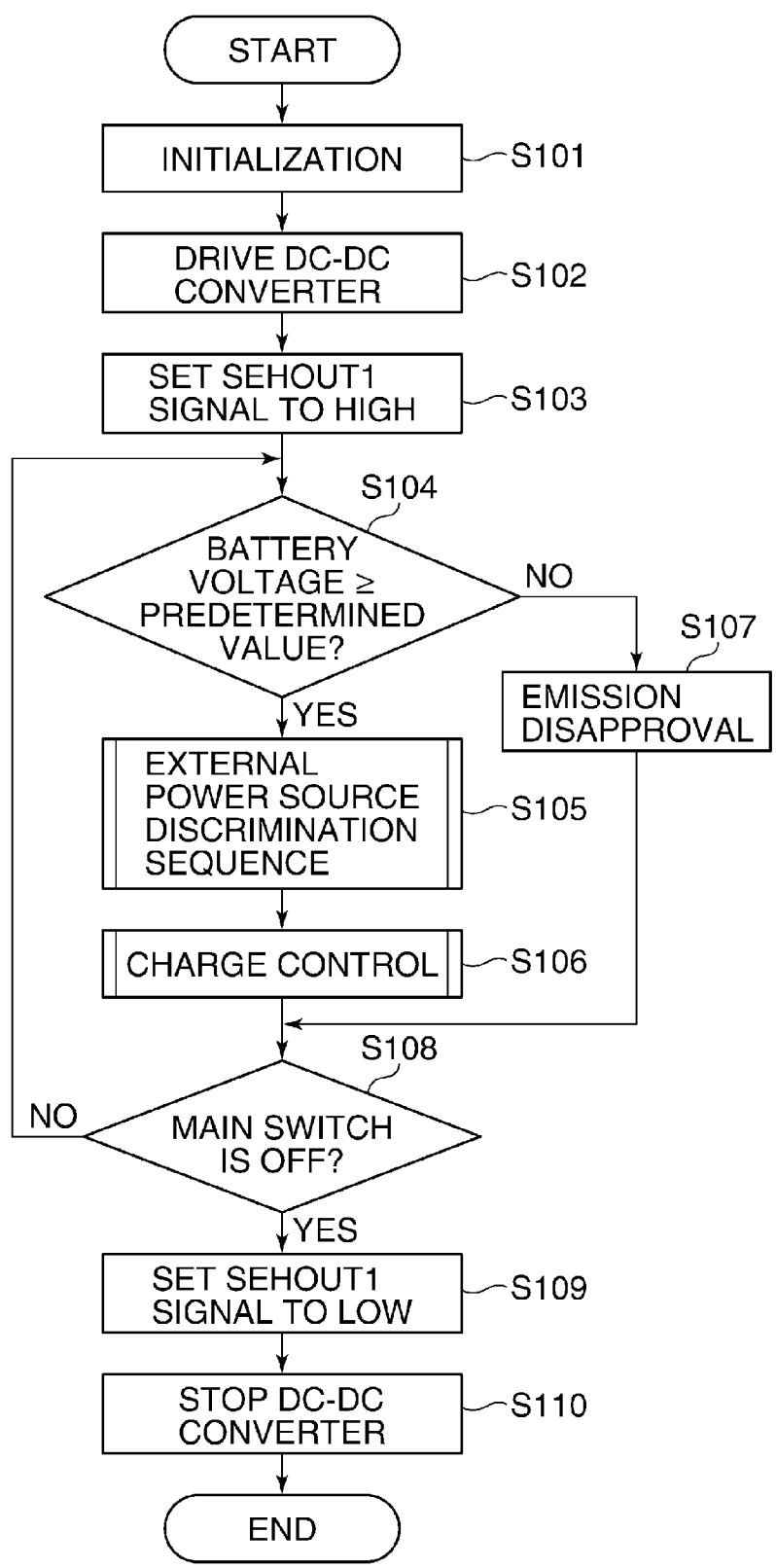
FIG. 4 is a flowchart describing a control sequence performed by the electronic flash device shown in FIG. 1.

FIG. 4 is a flowchart describing a control sequence performed by the electronic flash device 10. The microcomputer 100 controls an operation of each part of the electronic flash device 10, when its own CPU develops a program stored in its own ROM to its own RAM. And accordingly, each procedure in the flowchart in FIG. 4 is performed. The process will be started when the power switch of the electronic flash device 10 equipped with the battery 101 turns ON.

In step S101, the microcomputer 100 initializes each register, and sets each part constituting the electronic flash device 10 so as to enable emission control. In step S102, the microcomputer 100 outputs a driving signal DC-DC_ON to the DC-DC converter 103 to generate the predetermined stable voltage VDD from the battery 101 and to supply electric power to each part in the electronic flash device 10. Then, the microcomputer 100 controls the first input/output switching circuit 122 using a DIR1 signal to set the attribute of the SEH-signal terminal of the first connector 140 to the output in step S103. Moreover, the microcomputer 100 sets an SEHOUT1 signal to a High signal that is the voltage more than a predetermined level in the step S103. Accordingly, the microcomputer 100 outputs the High signal to the SEH-signal terminal of the first connector 140 through the first input/output switching circuit 122.

In step S104, the microcomputer 100 converts the voltage (BAT_AD) that the voltage of the battery 101 is resistively divided into a digital signal (A/D conversion), and determines whether the voltage of the battery 101 is equal to or more than a predetermined value. At this time, when the voltage of the battery 101 is equal to or more than the predetermined value, it is determined that there is no trouble in the control sequence of the electronic flash device 10. Accordingly, the microcomputer 100 proceeds with the process to step S105 when the voltage of the battery 101 is equal to or more than the predetermined value (YES in the step S104). When the voltage of the battery 101 is less than the predetermined value (NO in the step S104), the process proceeds to step S107. In the step S107, the microcomputer 100 transmits an emission disapproval signal to a camera body through the communication interface unit 112, and then, the microcomputer 100 proceeds with the process to step S108.

In the step S105, the microcomputer 100 determines whether an external power source device is connected to the electronic flash device 10 by performing an external power source discrimination sequence, and discriminates a type of an external power source device if it is connected. Details of the external power source discrimination sequence performed in the step S105 will be mentioned later.

The microcomputer 100 controls the charge to the main capacitor in the following step S106 on the basis of the result of the external power source discrimination sequence in the step S105. For example, the microcomputer 100 drives the booster circuit 104 to boost the voltage of the battery 101 to high voltage of some hundreds of volts and to charge the main capacitor 107 with electrical energy for emission. At this time, when the external power source device is connected to the electronic flash device 10, the main capacitor 107 receives power supply (supply of the boosted power) also from the external power source device. This shortens charging time of the main capacitor 107, and enables rapid emission control. When the external power source device is connected to the electronic flash device 10, the charge using the battery 101 in the electronic flash device 10 may be prohibited so as to charge the main capacitor 107 using the external power source device only. Although other various charge control methods are considered in a case where the external power source device is connected to the electronic flash device 10, descriptions thereof are omitted because the charge control method for the main capacitor 107 does not relate to the present invention directly.

In the charge control sequence in the step S106, the microcomputer 100 A/D-converts the voltage (HV_IN) that the voltage of the first voltage detecting circuit 106 is resistively divided into a digital signal, and determines whether the converted digital signal reached desired voltage (whether the charge was completed) within a predetermined time period. When the charge is not completed within the predetermined time period, the microcomputer 100 performs the same process as the step S107, and proceeds with the process to the step S108 after that. When the charge was completed, the microcomputer 100 transmits an emission approval signal to the camera body through the communication interface unit 112, and proceeds with the process to the step S108 after that.

In the step S108, the microcomputer 100 monitors the power switch and determines whether the power switch was turned OFF. When the power switch is kept ON (NO in the step S108), the microcomputer 100 returns the process to the step S104. When the power switch is turned OFF (YES in the step S108), the process proceeds to step S109. The microcomputer 100 controls the first input/output switching circuit 122 using the DIR1 signal to set the attribute of the SEH-signal terminal of the first connector 140 to the output, and sets the SEHOUT1 signal to a Low signal in step S109. Accordingly, the microcomputer 100 outputs the Low signal to the SEH-signal terminal of the first connector 140 through the first input/output switching circuit 122. Subsequently, the microcomputer 100 stops the driving signal DC-DC_ON to the DC-DC converter 103 to stop generation of the voltage VDD and the power supply to each part in the electronic flash device 10 in step 110. Accordingly, the control sequence in the electronic flash device 10 is finished.

Figure 5:
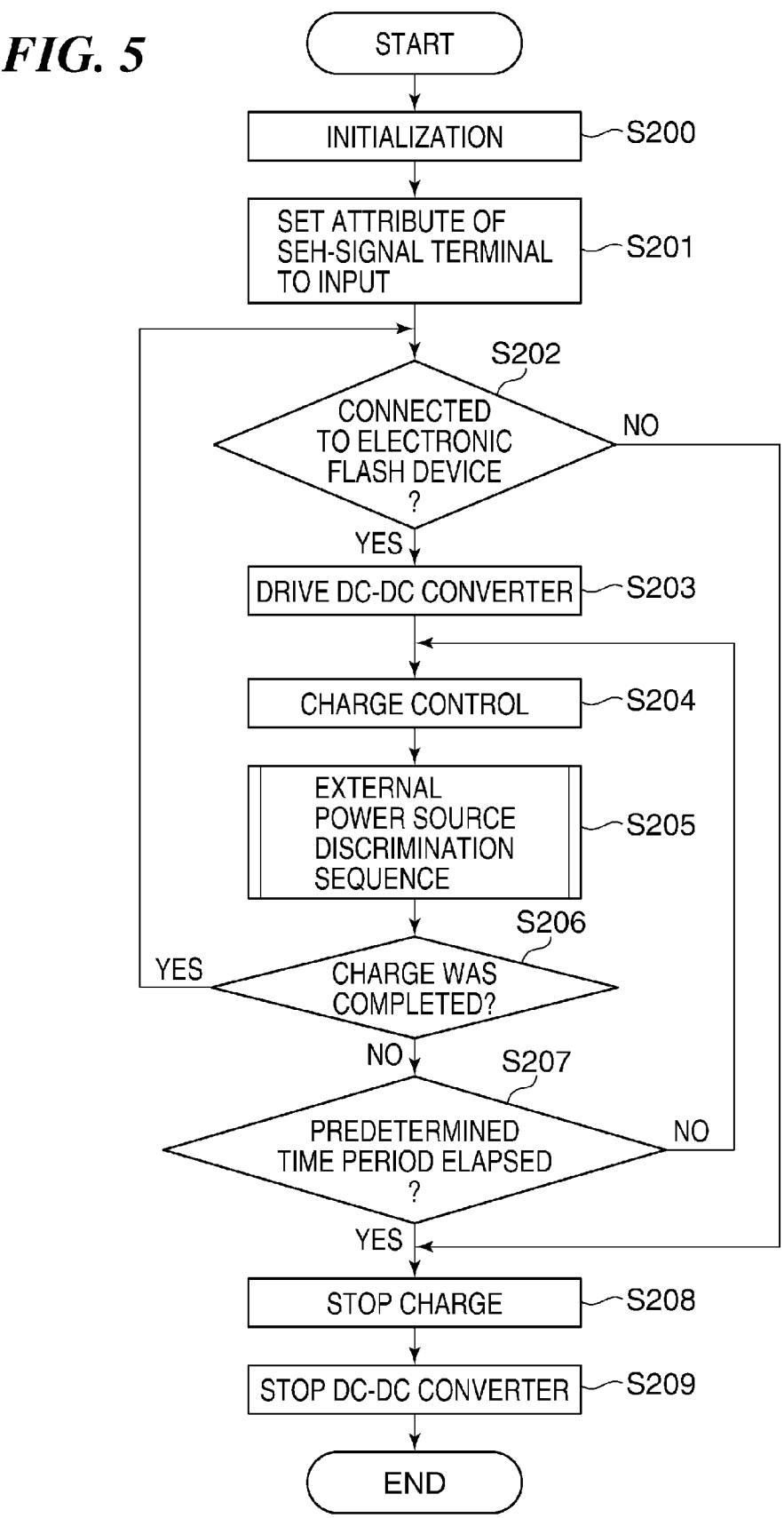
FIG. 5 is a flowchart describing a control sequence performed by the first external power source device shown in FIG. 2.

FIG. 5 is a flowchart describing a control sequence performed by the first external power source device 20. The microcomputer 200 controls an operation of each part of the electronic flash device 10, when its own CPU develops a program stored in its own ROM to its own RAM. And accordingly, each procedure in the flowchart in FIG. 5 is performed. The process will be started when the power switch of the electronic flash device 20 equipped with the battery 201 turns ON.

In step S200, the microcomputer 200 initializes each register, and sets each part constituting the first external power source device 20 so as to start the power supply to the electronic flash device 10. In step S201, the microcomputer 200 controls the second input/output switching circuit 222 using the DIR2 signal to set the attribute of the SEH-signal terminal of the first connector 240 to the input. In step S202, the microcomputer 200 determines whether the first external power source device 20 is connected to the electronic flash device 10 on the basis of the input signal (SEH signal) from the SEH-signal terminal of the second connector 240. When the SEH signal is equal to or more than the predetermined voltage value (YES in the step S202), the microcomputer 200 proceeds with the process to step S203. When the SEH signal is less than the predetermined voltage value (NO in the step S202), the process proceeds to step S208. When it is determined that the SEH signal is equal to or more than the predetermined voltage value in the step S202, the first external power source device 20 is connected to the electronic flash device 10 and the High signal is detected. When the SEH signal is less than the predetermined voltage value, the High signal is not detected (the Low signal is detected). In such a case, it is unnecessary to start the first external power source device 20.

In the step S203, the microcomputer 200 outputs a driving signal DC-DC_ON2 to the DC-DC converter 203 to generate the predetermined stable voltage VDD from the battery 201 and to supply electric power to each part in the first external power source device 20. Accordingly, the first external power source device 20 shifts to a charge controllable state. Accordingly, the microcomputer 200 drives the booster circuit 204 to boost the voltage of the battery 201 to high voltage of some hundreds of volts and to charge the main capacitor 107 of the electronic flash device 10 with electrical energy for emission through the second connector 240 in step S204

In the following step S205, the microcomputer 200 performs an external power source discrimination sequence. The external power source discrimination sequence in the step S205 links with the external power source discrimination sequence in the step S105 performed in the electronic flash device 10, and the details will be described later. It should be noted that the charge control is started before performing the external power source discrimination sequence in the step S205 when it is determined that the first external power source device 20 is connected to the electronic flash device 10 in this embodiment. This enables the electronic flash device 10 to emit promptly. However, the present invention is not limited to such a flowchart. The charge control may be started after performing the external power source discrimination sequence in the step S205.

In step S206, the microcomputer 200 AD-converts the voltage (VH_AD2) detected by the second voltage detecting circuit 206, and determines whether the converted digital signal is equal to or more than a predetermined value. That is, the microcomputer 200 determines whether the charge to the main capacitor 107 was completed. When the charge was completed (YES in the step S206), the microcomputer 200 returns the process to the step S202 for preparing the next charging operation. When the charge was not completed (NO in the step S206), the process proceeds to step S207. In the step S207, the microcomputer 200 determines whether a predetermined time period elapsed from the start of the charge control. It should be noted that the predetermined time period is set in a timer circuit in the microcomputer 200. When the predetermined time period elapses (YES in the step S207), the microcomputer 200 proceeds with the process to step S208. When the predetermined time period does not elapse (NO in the step S207), the process is returned to the step S204.

When the process proceeds to the step S208, the charge voltage does not reach a predetermined charge completion voltage (charge is not completed) within the predetermined time period. Accordingly, the microcomputer 200 stops the booster circuit 204 and finishes the charging operation in the step S208. In the following step S209, the microcomputer 200 stops transmission of the driving signal DC-DC_ON2 to the DC-DC converter 203. Accordingly, the electric supply to each part from the DC-DC converter 203 is stopped, and the charge sequence in the first external power source device 20 is finished. It should be noted that the control sequence of the second external power source device 30 is approximately the same as the control sequence shown in FIG. 5. However, since the SE_H-signal terminal of the second connector 240A of the second external power source device 30 is an input-only terminal, the process corresponding to the attribute setting of the SEH-signal terminal of the second connector 240 in the step S201 is not performed. That is a difference from the control sequence in FIG. 5.

Figure 6:
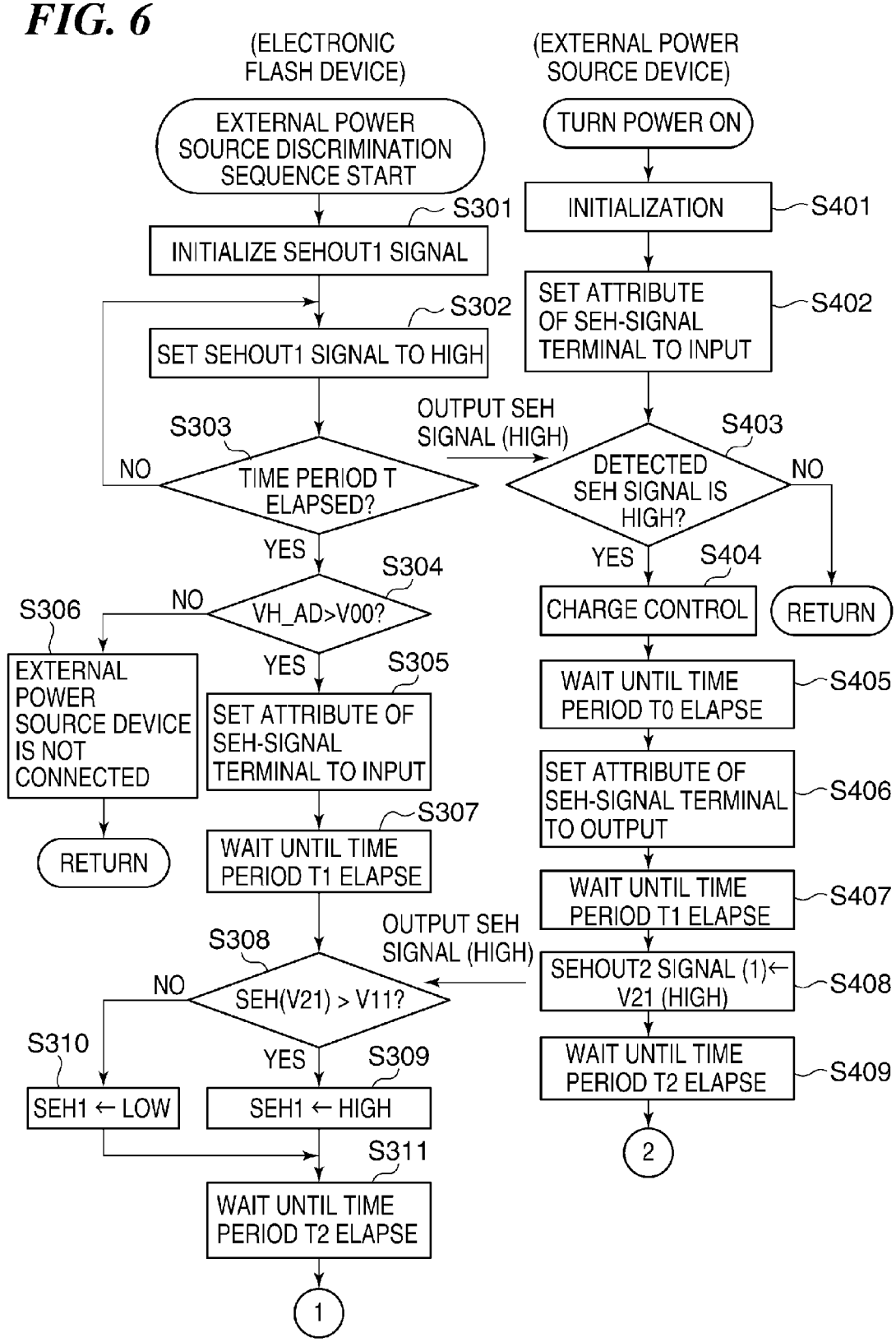
FIG. 6 is flowcharts of first parts of external power source discrimination sequences performed by the electronic flash device shown in FIG. 1 and the first external power source device shown in FIG. 2.
Figure 7:
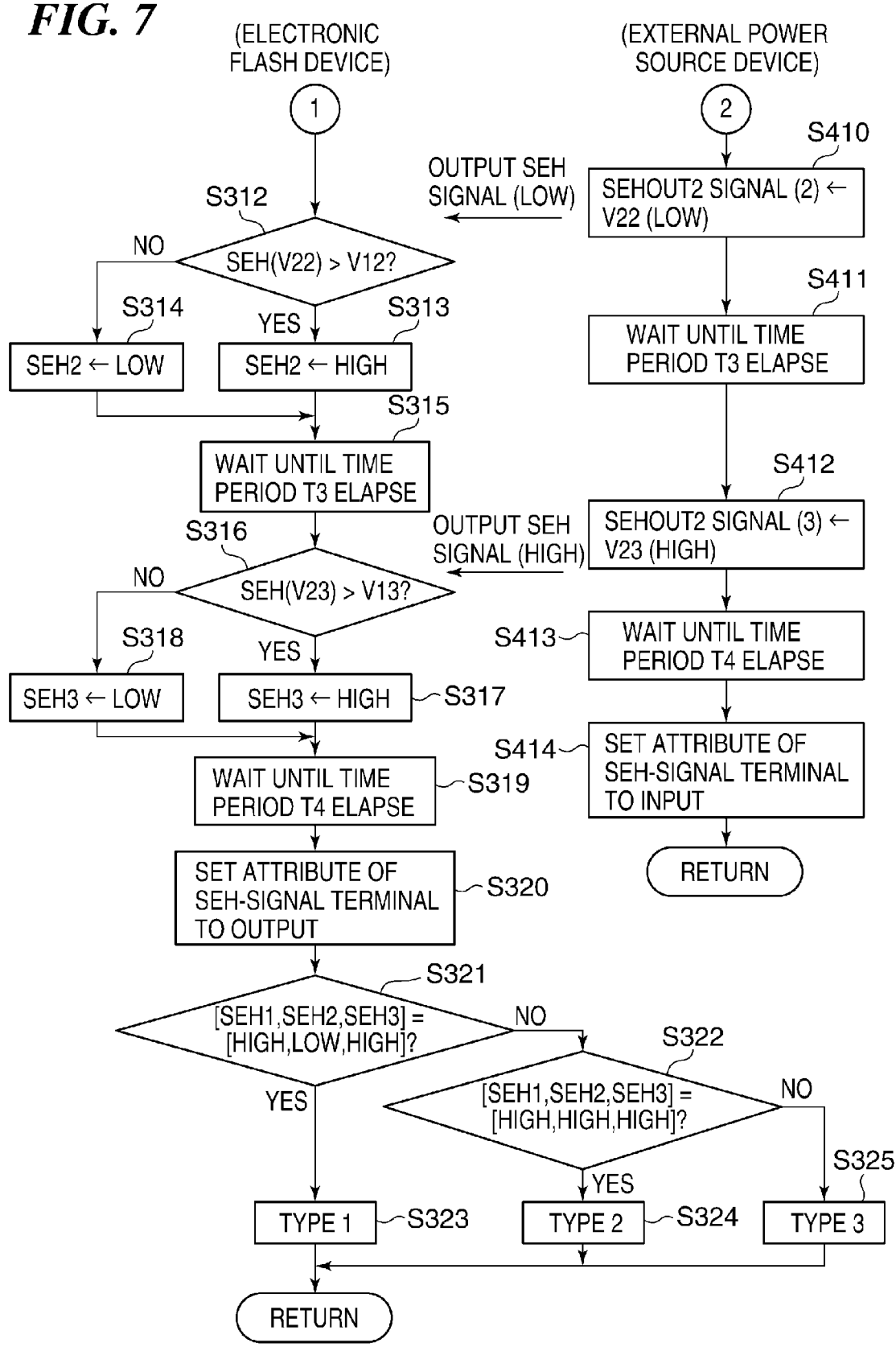
FIG. 7 is flowcharts of second parts of the external power source discrimination sequences following the sequences in FIG. 6 performed by the electronic flash device shown in FIG. 1 and the first external power source device shown in FIG. 2.

Next, the external power source discrimination sequences (the steps S105 and S205) in the electronic flash device 10 and the external power source device 20 will be described. FIG. 6 and FIG. 7 are flowcharts of the external power source discrimination sequences in the electronic flash device 10 and first external power source device 20. In the following description, the external power source discrimination sequence in the first external power source device 20 is described for convenience of description, and the sequence in the second external power source device 30 is suitably described as points different from the sequence in the first external power source device 20. Moreover, the process in the steps S200 and S201 shown in FIG. 5 is described again in the flowchart of the external power source device in FIG. 6 for convenience of description.

First, the external power source discrimination sequence performed by the electronic flash device 10 is described first. Until the process in the step S105 will be performed in the electronic flash device 10, it is unknown whether an external power source device is connected to the electronic flash device 10. Moreover, it is also unknown whether the external power source device is the first external power source device 20, the second external power source device 30, or the other external power source device. Consequently, the electronic flash device 10 determines whether an external power source device is connected by performing the external power source discrimination sequence, and discriminates a type of an external power source device if it is connected.

When the charge sequence in the electronic flash device 10 proceeds to the step S105 (subroutine), the microcomputer 100 initializes the SEHOUT1 signal in step S301. Then, the microcomputer 100 controls the first input/output switching circuit 122 using the DIR1 signal to set the attribute of the SEH-signal terminal of the first connector 140 to the output, and sets the SEHOUT1 signal to a High signal in step S302. This High signal shows that the electronic flash device 10 is in an operating state (a controlled state by the microcomputer 100). It should be noted that the process in the steps S301 and S302 may be performed as the process in the step S103.

In the step S303, the microcomputer 100 determines whether a predetermined time period T elapsed. It should be noted that the predetermined time period T is set to the timer circuit in the microcomputer 100. The microcomputer 100 waits while the predetermined time period T does not elapse (NO in the step S303), and proceeds with the process to step S304 when the predetermined time period elapsed (YES in the step S303).

In the step S304, the microcomputer 100 detects the resistively divided voltage (VH_AD) of the VH terminal of the first connector 140 with the external voltage detecting circuit 120, A/D-converts the detected resistively divided voltage, and determines whether the A/D conversion value is more than a first voltage threshold V00. When the A/D conversion value of the resistively divided voltage is equal to or less than the first voltage threshold V00 (NO in the step S304), the microcomputer 100 proceeds with the process to step S306, determines that an external power source device is not connected in the step S306, and finishes this process after that (returns to the process in FIG. 4). It should be noted that the process proceeds to the step S106 in FIG. 4 when the process in FIG. 6 finishes. On the other hand, when the A/D conversion value of the resistively divided voltage is more than the first voltage threshold V00 (YES in the step S304), the microcomputer 100 determines that an external power source device is connected, and proceeds with the process to step S305. In the step S305, the microcomputer 100 controls the first input/output switching circuit 122 using the DIR1 signal to set the attribute of the SEH-signal terminal of the first connector 140 to the input. Then, the microcomputer 100 waits in step S307 until a predetermined time period T1 elapses. It should be noted that the predetermined time period T1 is set to the timer circuit in the microcomputer 100.

In step S308, the microcomputer 100 checks a voltage value V21 of the SEH signal input into the first voltage determination circuit 123 from the external power source device via the SEH-signal terminal of the first connector 140 and the first input/output switching circuit 122 within the predetermined time period T1. The SEH signal of the voltage value V21 is output in step S408 of the process of the external power source device. The microcomputer 100 determines whether the voltage value V21 is more than a second voltage threshold V11 using the first voltage determination circuit 123. When the voltage value V21 is more than the second voltage threshold V11 (YES in the step S308), the microcomputer 100 proceeds with the process to step S309. When the voltage value V21 is equal to or less than the second voltage threshold V11 (NO in the step S308), the process proceeds to step S310.

The microcomputer 100 stores "SEH-signal: SEH1=High" in the step S309, or stores "SEH-signal: SEH1=Low" in the step S310 as a first determination result. It should be noted that the first determination result is stored in a RAM etc. of the microcomputer 100. After the step S309 or S310, the microcomputer 100 waits in step S311 until a predetermined time period T2 elapses. It should be noted that the predetermined time period T2 is set to the timer circuit in the microcomputer 100. After the predetermined time period T2 elapsed, the microcomputer 100 checks a voltage value V22 of the SEH signal input into the first voltage determination circuit 123 from the external power source device via the SEH-signal terminal of the first connector 140 and the first input/output switching circuit 122 in step S312 in FIG. 7. The SEH signal of the voltage value V22 is output in step S410 of the process of the external power source device. The microcomputer 100 determines whether the voltage value V22 is more than a third voltage threshold V12 using the first voltage determination circuit 123. When the voltage value V22 is more than the third voltage threshold V12 (YES in the step S312), the microcomputer 100 proceeds with the process to step S313. When the voltage value V22 is equal to or less than the third voltage threshold V12 (NO in the step S312), the process proceeds to step S314.

The microcomputer 100 stores "SEH-signal: SEH2=High" in the step S309, or stores "SEH-signal: SEH2=Low" in the step S314 as a second determination result. It should be noted that the second determination result is stored in the RAM etc. of the microcomputer 100. After the step S313 or S314, the microcomputer 100 waits in step S315 until a predetermined time period T3 elapses. It should be noted that the predetermined time period T3 is set to the timer circuit in the microcomputer 100. After the predetermined time period T3 elapsed, the microcomputer 100 checks a voltage value V23 of the SEH signal input into the first voltage determination circuit 123 from the external power source device via the SEH-signal terminal of the first connector 140 and the first input/output switching circuit 122 in step S316. The SEH signal of the voltage value V23 is output in step S412 of the process of the external power source device. The microcomputer 100 determines whether the voltage value V23 is more than a fourth voltage threshold V13 using the first voltage determination circuit 123. When the voltage value V23 is more than the fourth voltage threshold V13 (YES in the step S316), the microcomputer 100 proceeds with the process to step S317. When the voltage value V23 is equal to or less than the second voltage threshold V13 (NO in the step S316), the process proceeds to step S318.

The microcomputer 100 stores "SEH-signal: SEH3=High" in the step S317, or stores "SEH-signal: SEH3=Low" in the step S310 as a third determination result. It should be noted that the third determination result is stored in the RAM etc. of the microcomputer 100. After the step S317 or S318, the microcomputer 100 waits in step S319 until a predetermined time period T4 elapses. It should be noted that the predetermined time period T4 is set to the timer circuit in the microcomputer 100.

The microcomputer 100 controls the first input/output switching circuit 122 using the DIR1 signal to set the attribute of the SEH-signal terminal of the first connector 140 to the output in step S320. In step S321, the microcomputer 100 determines whether a first combination of [SEH1, SEH2, SEH3]=[High, Low, High] is obtained. When the first combination is not obtained (NO in the step S321), the microcomputer 100 proceeds with the process to step S322. When the first combination is obtained (YES in the step S321), the process proceeds to step S323. In the step S322, the microcomputer 100 determines whether a second combination of [SEH1, SEH2, SEH3]=[High, High, High] is obtained. When the second combination is obtained (YES in the step S322), the microcomputer 100 proceeds with the process to step S324. When the second combination is not obtained (NO in the step S322), the process proceeds to step S325.

In step S323, the microcomputer 100 determines that the external power source device connected is Type 1 (i.e., the first external power source device 20). In the step S324, the microcomputer 100 determines that the external power source device connected is Type 2 (i.e., the second external power source device 30). Moreover, in step S325, the microcomputer 100 determines that the external power source device connected is Type 3 that is not the first external power source device 20 or the second external power source device 30. When the step S323, S324, or S325 is finished, this process is finished. Then, the microcomputer 100 proceeds with the process to the step S106 in FIG. 4.

Next, the external power source discrimination sequence performed by the first external power source device 20 will be described. The first external power source device 20 performs the determination process in the step S202 in response to the output of the High signal from the SEH-signal terminal of the first connector 140 of which the attribute is set to the output in the electronic flash device 10 in the step S302. That is, the microcomputer 200 of the first external power source device 20 determines whether the first external power source device 20 is electrically connected to the electronic flash device 10 until the predetermined time period T elapses from the timing at which the electronic flash device 10 executes the process in the step S302. Specifically, the microcomputer 200 initializes each register in step S401, and controls the second input/output switching circuit 222 using the DIR2 signal to set the attribute of the SEH-signal terminal of the second connector 240 to the input in step S402. It should be noted that the process in the step S402 is not performed in the second external power source device 30 because the attribute of the SE_H-signal terminal of the second connector 240A is always set to the input.

In step S403, the microcomputer 200 determines whether the SEH signal that is received from the electronic flash device 10 through the second connector 240 is a High signal or a Low signal. When the Low signal is detected, the microcomputer 200 determines that it is unnecessary to start the first external power source device 20, and finishes this process (returns to the process in FIG. 5). In this case, the process proceeds from the step S202 to the step S208 of the flowchart in FIG. 5. On the other hand, when the first external power source device 20 is electrically connected to the electronic flash device 10, the first external power source device 20 receives the High signal set in the step S302 from the electronic flash device 10 through the second connector 240. Accordingly, the microcomputer 200 proceeds with the process to step S404, when a High signal is received. When the second external power source device 30 is electrically connected to the electronic flash device 10, the second external power source device 30 receives similarly the High signal set in the step S302 from the electronic flash device 10 through the second connector 240A.

In the step S404, the microcomputer 200 starts the charge control corresponding to the steps S203 and S204. Accordingly, high voltage is supplied to the electronic flash device 10 through the VH terminals of the first connector 140 and second connector 240. After that, the microcomputer 200 continues the charge control in step S405 until a predetermined time period T0 elapses. It should be noted that the predetermined time period T0 is set to the timer circuit in the microcomputer 200.

When the predetermined time period T0 elapsed, the microcomputer 200 controls the second input/output switching circuit 222 using the DIR2 signal to set the attribute of the SEH-signal terminal of the second connector 240 to the output in step S406. Then, the microcomputer 200 waits in step S407 until the predetermined time period T1 elapses. After the predetermined time period T1 elapsed, the microcomputer 200 sets the SEHOUT2 signal to the High signal of the voltage value V21 in step S408. Accordingly, the first external power source device 20 outputs the High signal to the electronic flash device 10 through the SEH-signal terminals of the first connector 140 and second connector 240. And the electronic flash device 10 determines whether the high signal was received in the step S308. As a result, when the first external power source device 20 is connected to the electronic flash device 10, the determination in the step S308 becomes "YES".

When the second external power source device 30 is connected, the process in and after the step S406 is not performed and the attribute of the SE_H-signal terminal of the second connector 240 is always set to the input because the attribute of the SE_H-signal terminal of the second connector 240A cannot be changed. Accordingly, when the second external power source device 30 is connected, the electronic flash device 10 always detects the High signal as the SEH signal due to an effect of a pull-up resistor (not shown) connected to the SE_H-signal terminal, and the determination in the step S308 becomes "YES".

After the step S408, the microcomputer 200 waits in step S409 until the predetermined time period T2 elapses. After the predetermined time period T2 elapsed, the microcomputer 200 sets the SEHOUT2 signal to the Low signal of the voltage value V22 in step S410 in FIG. 7. Accordingly, the first external power source device 20 outputs the Low signal to the electronic flash device 10 through the SEH-signal terminals of the first connector 140 and second connector 240. And the electronic flash device 10 determines whether the Low signal was received in the step S312. As a result, when the first external power source device 20 is connected to the electronic flash device 10, the determination in the step S312 becomes "NO". When the second external power source device 30 is connected to the electronic flash device 10, the determination in the step S312 becomes "YES" because the electronic flash device 10 always detects the High signal as the SEH signal.

After the step S410, the microcomputer 200 waits in step S411 until the predetermined time period T3 elapses. After the predetermined time period T3 elapsed, the microcomputer 200 sets the SEHOUT2 signal to the High signal of the voltage value V23 in step S412. Accordingly, the first external power source device 20 outputs the High signal to the electronic flash device 10 through the SEH-signal terminals of the first connector 140 and second connector 240. And the electronic flash device 10 determines whether the high signal was received in the step S316. As a result, when the first external power source device 20 is connected to the electronic flash device 10, the determination in the step S316 becomes "YES". When the second external power source device 30 is connected to the electronic flash device 10, the determination in the step S316 becomes "YES" because the electronic flash device 10 always detects the High signal as the SEH signal.

After the step S412, the microcomputer 200 waits in step S413 until the predetermined time period T4 elapses. When the predetermined time period T4 elapsed, the microcomputer 200 controls the second input/output switching circuit 222 using the DIR2 signal to set the attribute of the SEH-signal terminal of the second connector 240 to the input in step S414. Accordingly, this process is finished and the microcomputer 200 proceeds with the process to the step S206.

Figures 8A, 8B:
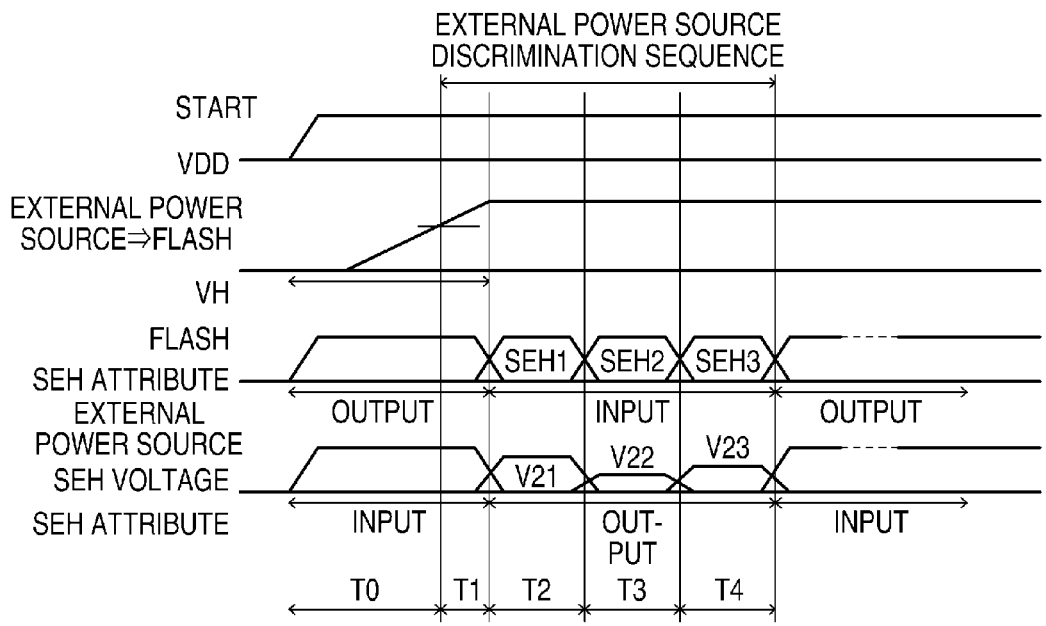
FIG. 8A is a timing chart corresponding to the flowcharts in FIG. 6 and FIG. 7.
FIG. 8B is a view showing a relation between detection results of an SEH signal and types of external power source devices.

FIG. 8A is a timing chart showing a relationship between the attribute settings of the SEH-signal terminals of the electronic flash device 10 and first external power source device 20 and the voltage values set to the SEH signals in the flowcharts in FIG. 6 and FIG. 7, respectively. FIG. 8B is a view showing the relation between the detection result of the SEH signal and the type of the external power source device.

In the case where the first external power source device 20 (type 1) is connected, the microcomputer 200 controls the second input/output switching circuit 222 to set the attribute of the SEH-signal terminal to the input, to switch the attribute of the SEH-signal terminal to the output after the predetermined time period, and to change the voltage value of the output signal (SEH signal) sequentially. Specifically, the output signal is set to the voltage value V21 (S407 and S408) when the predetermined time period T1 elapses, is set to the voltage value V22 (S409 and S410) when the predetermined time period T2 elapses, and is set to the voltage value V23 (S411 and S412) when the predetermined period T3 elapses. After that, the microcomputer 200 switches the attribute of the SEH-signal terminal from the output to the input after the predetermined period T4 elapses. The first external power source device 20 performs the above-mentioned process in order to make the electronic flash device 10 specify its own configuration. The voltage values of the SEH signal that are output to the electronic flash device 10 vary when the type of an external power source device differs.

When the SEH signal of which voltage value varies V21, V22, and V23 sequentially is transmitted to the electronic flash device 10 from the first external power source device 20, the microcomputer 100 of the electronic flash device 10 determines whether each of these voltage values is the High signal or the Low signal by comparing the voltage value with the predetermined voltage threshold. Since the combination of [SEH1, SEH2, SEH3]=[High, Low, High] is obtained in the case of the first external power source device 20, an ID signal of [1, 0, 1] is obtained. On the other hand, since the combination of [SEH1, SEH2, SEH3]=[High, High, High] is obtained in the case of the second external power source device 30, an ID signal of [1, 1, 1] is obtained.

The microcomputer 100 stores beforehand the ID signal patterns for the respective external power source devices to the ROM etc. It should be noted that the ID signal patterns can be replaced to new ID signal patterns supplied from an image pickup apparatus through the communication interface unit 112. The microcomputer discriminates the type of the connected external power source device by contrasting the detected ID signal with the ID signal patterns. In this embodiment, when the detected ID signal is [1, 0, 1], the microcomputer 100 determines that the first external power source device 20 (Type 1) is connected. When the detected ID signal is [1, 1, 1], the microcomputer 100 determines that the second external power source device 30 (Type 2) is connected. Moreover, when the detected ID signal is not [1, 0, 1] or [1, 1, 1], the microcomputer 100 determines that another type of an external power source device is connected. As mentioned above, the electronic flash device 10 discriminates the type of the external power source device based on the ID signal specified by the SEH signal obtained from the external power source device as the information about the external power source device. It is unnecessary to increase the number of terminals of the first connector 140 (it is unnecessary to change the configuration of the connector), which avoids adding a new restriction to the electric connection with the electronic flash device 10, allowing both of the new-type and old-type external power source devices to connect.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-013499, filed on Jan. 27, 2016, which is hereby incorporated by reference herein in its entirety.

What is claimed is:

1. A lighting device comprising:
a light emitting component;
a main capacitor that supplies electric power to said light emitting component;
a connector that is electrically connectable to an external power source device, and that includes a first terminal for supplying electric power from the external power source device to said main capacitor and a second terminal for discriminating a type of the external power source device;
a switching unit configured to switch an input-output attribute of the second terminal;
a storage unit configured to store information for discriminating a type of an external power source device connectable to said connector;
an obtaining unit configured to obtain the information for discriminating the type of the external power source device by comparing a voltage value of a signal input to the second terminal from the external power source device with a predetermined voltage threshold when said switching unit sets the attribute of the second terminal to an input; and
a discrimination unit configured to discriminate the type of the external power source device by contrasting the information that said obtaining unit obtained with the information stored in said storage unit.

2. The lighting device according to claim 1, further comprising a voltage detection unit configured to detect voltage of the first terminal,
wherein said obtaining unit obtains the information for discriminating the type of the external power source device when said voltage detection unit detects that predetermined voltage is supplied to the first terminal.

3. The lighting device according to claim 2, wherein said obtaining unit detects temporal variation of voltage value of a signal input to the second terminal until a predetermined time period elapses after detecting that the predetermined voltage is supplied to the first terminal, and compares each of the detected voltage values with the predetermined voltage threshold.

4. The lighting device according to claim 3, wherein the information for discriminating the type of the external power source device is a combination of compared results of whether the voltage values input to the second terminal are more than the predetermined voltage threshold.

5. A lighting system comprising:
a lighting device; and
an external power source device that is electrically connectable to said lighting device,
wherein said lighting device comprises:
a light emitting component;
a main capacitor that supplies electric power to said light emitting component;
a first connector that is electrically connectable to an external power source device, and that includes a first terminal for supplying electric power from the external power source device to said main capacitor and a second terminal for discriminating a type of the external power source device;
a first switching unit configured to switch an input-output attribute of the second terminal;
a storage unit configured to store information for discriminating a type of an external power source device connectable to said first connector;
an obtaining unit configured to obtain the information for discriminating the type of the external power source device by comparing a voltage value of a signal input to the second terminal within a predetermined time period with a predetermined voltage threshold when said first switching unit sets the attribute of the second terminal to an input; and
a discrimination unit configured to discriminate the type of the external power source device by contrasting the information that said obtaining unit obtained with the information stored in said storage unit,
wherein said external power source device comprises:
a second connector that includes a third terminal that is connectable to the first terminal and supplies electric power to said main capacitor and a fourth terminal that is connectable to the second terminal and detects at least a state of said lighting device; and
a power supply unit configured to supply predetermined high voltage to the third terminal.

6. The lighting system according to claim 5, wherein said lighting device further comprises a first control unit configured to control said first switching unit to set the attribute of the second terminal to an output when power of said lighting device is turned on, and to output a signal showing that said lighting device is in an operating state to the second terminal, wherein said external power source device further comprises:
a second switching unit configured to switch an input-output attribute of the fourth terminal; and
a second control unit configured to control said second switching unit to set the attribute of the fourth terminal to an input when the power is turned on, and to control said power supply unit to start supplying the high voltage to the third terminal when the signal showing that said lighting device is in the operating state is obtained from the fourth terminal.

7. The lighting system according to claim 6, wherein said second control unit controls said second switching unit to set the attribute of the fourth terminal to an output after said power supply unit starts supplying the predetermined high voltage to the third terminal, and transmits the information for discriminating the type of the external power source device to said lighting device through the fourth terminal.

8. The lighting system according to claim 7, wherein said lighting device further comprises a voltage detection unit configured to detect voltage of the first terminal, wherein said obtaining unit of said lighting device obtains the information for discriminating the type of the external power source device after said voltage detection unit detects that predetermined voltage is supplied to the first terminal.

9. The lighting system according to claim 7, wherein said second control unit outputs a signal that indicates temporal variation of the voltage value to the fourth terminal as the information for discriminating the type of the external power source device, and wherein said obtaining unit of said lighting device detects the temporal variation of the voltage value of the signal input to the second terminal until from said second control unit through the fourth terminal, and uses a combination of compared results of whether the voltage values input to the second terminal are more than the predetermined voltage threshold as the information for discriminating the type of the external power source device.

10. An external power source device electrically connectable to a lighting device that includes a light emitting component, a main capacitor that supplies electric power to the light emitting component, a first connector that is electrically connectable to the external power source device and that includes a first terminal for supplying electric power from the external power source device to the main capacitor and a second terminal for discriminating the external power source device, a first switching unit that switches an input-output attribute of the second terminal, a storage unit that stores information for discriminating a type of an external power source device connectable to the first connector, an obtaining unit that obtains the information for discriminating the type of the external power source device by comparing a voltage value of a signal input to the second terminal within a predetermined time period with a predetermined voltage threshold when the first switching unit sets the attribute of the second terminal to an input, and a discrimination unit that discriminates the type of the external power source device by contrasting the information that the obtaining unit obtained with the information stored in the storage unit, the external power source device comprising:

a second connector that includes a third terminal that is connectable to the first terminal and supplies electric power to the main capacitor and a fourth terminal that is connectable to the second terminal and detects at least a state of the lighting device; and a power supply unit configured to supply predetermined high voltage to the third terminal.

* * * * *